(12) United States Patent
Arvidsson et al.

(10) Patent No.: US 11,632,900 B2
(45) Date of Patent: Apr. 25, 2023

(54) PLANTING SYSTEM

(71) Applicant: PLANTMA AB, Grangarde (SE)

(72) Inventors: Hans Arvidsson, Grangarde (SE); Tobias Arvidsson, Gavle (SE)

(73) Assignee: PLANTMA AB, Grangarde (SE)

( * ) Notice: Subject to any disclaimer, the term of this patent is extended or adjusted under 35 U.S.C. 154(b) by 0 days.

(21) Appl. No.: 17/638,278

(22) PCT Filed: Sep. 2, 2020

(86) PCT No.: PCT/SE2020/050829
§ 371 (c)(1),
(2) Date: Feb. 25, 2022

(87) PCT Pub. No.: WO2021/045666
PCT Pub. Date: Mar. 11, 2021

(65) Prior Publication Data
US 2022/0264791 A1 Aug. 25, 2022

(30) Foreign Application Priority Data
Sep. 2, 2019 (SE) .................................... 1950997-5

(51) Int. Cl.
*A01C 11/02* (2006.01)
*A01B 79/00* (2006.01)

(52) U.S. Cl.
CPC .......... *A01C 11/025* (2013.01); *A01B 79/005* (2013.01)

(58) Field of Classification Search
CPC ....... A01C 11/025; A01C 11/02; A01C 11/00; A01B 79/005; A01B 79/00
See application file for complete search history.

(56) References Cited

U.S. PATENT DOCUMENTS 6,164,223 A    12/2000    Eriksson

FOREIGN PATENT DOCUMENTS

| JP | 200995274 A | 5/2009 |
|----|-------------|--------|
| SE | 7316167-1 | 5/1975 |
| SE | 7412415-7 | 5/1975 |
| SE | 1850109 A1 | 8/2018 |

(Continued)

OTHER PUBLICATIONS

International Search Report from corresponding PCT Application No. PCT/SE2020/050829 dated Sep. 24, 2020.

(Continued)

*Primary Examiner* — Christopher J. Novosad
(74) *Attorney, Agent, or Firm* — Harness Dickey & Pierce P.L.C.

(57) ABSTRACT

A planting system (100) for arrangement on a vehicle (110) comprises at least one plant arm (130) comprising a plant head (140) configured to penetrate ground and a plant feeding device (120) configured to feed plant seedlings (125) to the plant arm by dropping the plant seedlings from the plant feeding device. The plant arm comprises at least one articulation (180) and is configured to receive plant seedlings (125) and to guide the plant seedlings to the plant head. The planting system is configured to operate the plant arm by penetrating the ground and release the plant seedlings from the plant head into the ground while the plant system (100) is in motion and the plant head has a fixed position relative the ground. The plant seedlings fall from the plant feeding device (120) to the plant head (140) while the plant arm (130) is in motion.

15 Claims, 9 Drawing Sheets

(56) References Cited

FOREIGN PATENT DOCUMENTS

| WO | 1998031209 A1 | 7/1998 |
| WO | 2013135971 A1 | 9/2013 |
| WO | 2018098576 A1 | 6/2018 |

OTHER PUBLICATIONS

Written Opinion from corresponding PCT Application No. PCT/SE2020/050829 dated Sep. 24, 2020.
Johnsen, "First images on Plantma planting machine" https://skogsforum.se/viewtopic.php?t=35170 (Jun. 6, 2019).
Hallonborg, "The development of mechanical planting" Swedish University of Agriculture, Department of Forest Production (1991).
"Silva Nova Midas (Serial No. 107-, 93 03 18)", Service Binder (1993).
"MidiFlex—a nv IVP of scarifiers" Press Release, Alfta, Sweden, 0271-75 (2017).
Supplemental Disclosure to D1 (Silva Nova Midas (Serial No. 107-, 93 03 18), Service Binder (1993)).

PLANTING SYSTEM

PRIORITY STATEMENT

This application is a national stage application under 35 U.S.C. § 371 of PCT International Application No. PCT/SE2020/050829, which has an international filing date of 2 Sep. 2020 and claims priority under 35 U.S.C. § 119 to Sweden Patent Application No. 1950997-5 filed on 2 Sep. 2019. The contents of each application recited above are incorporated herein by reference in their entirety.

TECHNICAL FIELD

The inventive concept described herein generally relates to a planting system for planting plant seedlings and a method thereof.

BACKGROUND

In the process of reforestation one may rely on plants to reproduce themselves or planting. In the latter, plant seedlings are often planted in the clear-felled area being the result of a deforestation of an area. In the past, planting of seedlings has mostly been done manually by hand or simple tools to plant the plant seedlings into the ground. Today, planting plant seedlings machines may be used. The plant seedlings may be stored in a vehicle and loaded to a magazine or compartment before being positioned into the ground. However, it has been shown that the planting yield, i.e. the amount of successfully planted plant seedlings and plant seedling still being alive with time, may be adversely affected by using some machines and/or automated processes. It has also been shown that the speed of planting plant seedlings may be inadequate due to that the transportation of plant seedlings from storage to planting point is complicated and time consuming.

SUMMARY OF THE INVENTION

It is an object of the present inventive concept to mitigate, alleviate or eliminate one or more of the above-identified deficiencies in the art and disadvantages singly or in combination. In particular, it may be desirable to facilitate the planting procedure to facilitate circumstances that may increase the planting yield. To better address one or more of these concerns, a system and method having the features defined in the independent claims are provided. Preferable embodiments are defined in the dependent claims.

Hence, according to a first aspect of the inventive concept, these and other objects are achieved by a planting system for arrangement on a vehicle, wherein the planting system may comprise at least one plant arm comprising a plant head configured to penetrate ground, wherein the at least one plant arm may comprise at least one articulation and is configured to receive plant seedlings and to guide the plant seedlings to the plant head, and a plant feeding device for arrangement on the vehicle and configured to feed plant seedlings to the at least one plant arm by dropping the plant seedlings from the plant feeding device, wherein the planting system, in a first stage of a planting process, may be configured to feed plant seedlings from the plant feeding device, via the at least one plant arm, to the plant head, by operation of the plant feeding device, and wherein the planting system, in a second stage of a planting process, may be configured to operate the at least one plant arm by penetrating the ground by the plant head and release the plant seedlings from the plant head into the ground while the plant system is in motion. The plant seedlings may fall from the plant feeding device to the plant head while the plant arm is in motion. The plant head may have a fixed position relative the ground when in the second stage of a planting process by the plant arm pivoting around the at least one articulation.

By the term "guide the plant seedlings", it is here meant that the plant seedlings are guided, steered or directed. Hence, the plant arm may be configured to guide, steer or direct the plant seedlings.

By the term "penetrating the ground", it is here meant that the plant head passes the top layer of the soil and/or ground.

By the term "articulation", it may here be meant one or more joints.

Hence, the present disclosure may be based on the idea to feed plant seedlings to the at least one plant arm at least partially by gravitation and using the at least one plant arm for planting plant seedlings. By dropping the plant seedlings from the plant feeding device, the plant seedlings may be fed to the at least one plant arm by gravitation. In other words, the plant seedlings may be fed to the at least one plant arm by gravitation, the plant seedlings are released from the plant feeding device and gravitation and/or forces due to falling may be acting on the plant seedlings in order for the plant seedlings to reach the at least one plant arm.

The planting system may facilitate transportation of plant seedlings from the plant feeding device to the plant head. This may be advantageous in that the force exerted on the plant seedlings when traveling from the plant feeding device to the plant head is limited to the force acting on the plant seedlings due to gravity. The planting system is advantageous in that the speed and reliability of the planting of the plant seedlings is enhanced. Furthermore, it has been observed by the inventor that high external forces acting on the plant seedlings may affect the plant seedlings negatively and may damage them. Hence, this may decrease the amount of damaged plant seedlings, and may consequently increase the possibility of the plant seedlings surviving. Therefore, the planting system is advantageous in that the planting yield (e.g. the rate of plant seedlings being properly planted and/or plants surviving after planting) may be improved.

The at least one plant arm comprising at least one articulation may be advantageous in that planting of plant seedlings may be performed while the planting system is in motion relative the ground. In other words, the planting system may be moving relative the ground while planting the plant seedlings. This may be achieved since at least part of the plant arm(s) may move, in relation to for example a vehicle when the system is arranged onto a vehicle. At least a part of the plant arm may be substantially stationary relative the ground when planting. In other words, the plant arm may pivot around the at least one articulation while performing the planting of the plant seedlings. The plant arm may move pivotally around at least one articulation such that at least part of the plant head may be stationary relative the ground and a second part of the plant arm may be moving relative the ground. The second part of the plant arm may move together with for example a vehicle when the system is arranged onto a vehicle.

By the one or more plant arms comprising at least one articulation, the planting system is advantageous in that an improved reach for the planting system is provided. Consequently, this facilitates the planting since planting may be performed outside the ground area covered by the vehicle. It may also provide having an angle of incidence of the plant arm to the ground substantially the same as that of the normal to the ground. In other words, an approach of the plant arm towards the ground substantially perpendicular to the ground plane may be achieved. This may be achieved since the plant arm may act similar to that of a pendulum.

The at least one plant arm may comprise a plant channel for receiving the plant seedlings and for guiding the plant seedlings to the plant head.

By the term "plant channel", it may here be meant a channel, a pipe or other means for guiding the plant seedlings from the plant feeding device to the plant head. The plant channel may comprise enclosing walls that may be partly open or closed. The enclosing walls may be partly open or closed along the direction of travel of the plant seedlings. This may facilitate the transportation of the plant seedlings from the plant feeding device to the plant head.

The plant channel may comprise a flared opening for receiving the plant seedlings. By the term "opening", it may here be meant the opening of the channel arranged to receive the plant seedlings. In other words, the opening may be the opening arranged substantially in the upper end of the plant channel facing the plant feeding device. By the term "flared opening", it is hereby meant that the opening has a gradually wider opening. In other words, the opening may be shaped as a funnel. This may facilitate transportation of plant seedlings from the plant feeding device to the plant head. More specifically, this may facilitate the transportation of plant seedlings after being released from the plant feeding device to the plant channel. This may provide an increased yield of the plant seedlings since a higher amount of plant seedlings may travel a predetermined way when falling from the plant feeding device to the plant channel.

The plant feeding device may comprise a circulating transport device comprising at least one plant holder wherein the circulating transport device may be configured to repeatedly transport the at least one plant holder from a first position, in which the at least one plant holder is arranged to receive a plant seedling, to a second position, in which the at least one plant holder may be configured to release the plant seedling, and back to the first position. By repeatedly transporting the holder from the first position to the second position and back again, the circulating device may transport the plant holder in at least one of a cyclic and repetitive motion. In the first position the plant holder may receive a plant seedling and the plant seeding may then be transported to the second position where the plant seedling may be released. This may be advantageous in that a repeated loading process may be enabled and/or that the loading of plant seedlings to the planting system may be facilitated. Further, this may be advantageous in that a transportation from the first position to the second position may be facilitated.

The at least one plant holder may comprise a side wall for keeping the plant seedlings in an upright position, and a bottom lid configured to open for releasing the plant seedling when the at least one plant holder is in the second position. This may be advantageous in that a facilitated holding of the plant seedlings when transporting the plant seedling from the first position into the second position may be provided. This may further be advantageous in that a facilitated feeding of the plant seedlings from the first to the second position may be provided.

The planting system may comprise a ground analyzing device configured to analyze at least one property of the ground, and an actuator communicatively coupled to the ground analyzing device, wherein the ground analyzing device may be configured to send a first set of data of the at least one property of the ground to the actuator, and wherein the actuator may be configured to operate the plant feeding device and the at least one plant arm based on the first set of data. By the term "communicatively coupled", it may hereby be meant wired or wireless communication. The ground analyzing device may generate the first set of data based on at least one of its analysis of the ground and a predetermined plant position. This may be advantageous in that the planting yield may be even further improved since possible obstacles or other circumstances may be taken into account when planting the plant seedlings. For instance, roots or stumps from trees may affect the planting negatively. The roots or stumps from trees or other obstacles may therefore be identified and the actuator may operate the plant feeding device and the at least one plant arm based on the identified obstacles. Large rocks or a generally rocky terrain may affect the planting negatively (e.g. the plant seedlings may not reach a desired planting depth, the plant seedlings may not be positioned in the ground at all or the at least one plant arm may be damaged from striking a hard surface once or repeatedly) and may be identified by the ground analyzing device.

The ground analyzing device may comprise a non-invasive measurement device configured to measure at least one property of the ground without physically contacting the ground during measurement. By the term "non-invasive measurement", it is meant a contactless measurement. In other words, the non-invasive measurement device may perform a measurement of the ground without coming into contact with the ground or in other ways interacting directly (physically) with the ground.

This may be advantageous in that the ground may be analyzed without affecting the ground. The planting system may hereby provide an intermittent planting of plant seedlings. Hence, having a contactless measurement may provide an energy efficient solution, since information may be given when and when not to use devices such as the planting arm.

The planting system may comprise a scarifier configured to prepare the ground for planting seedlings. By the term "scarifier", it may here be meant a device to scar the ground, such as a mounder or the like. In other words, a scarifier may be a device to prepare the ground. The ground may be prepared in different ways in order to enhance planting of plant seedlings. This may be advantageous in that the planting yield (e.g. the rate of plant seedlings being properly planted and/or plants surviving after planting may be improved) may be increased since the ground may be prepared in a predetermined way. Furthermore, the planting of plant seedlings may be facilitated and the planting conditions may be improved. Furthermore, the mineral soil at the desired planting position may be exposed, and may facilitate the planting conditions.

The actuator may be operatively coupled to the scarifier and configured to operate the scarifier based on the first set of data. This may be advantageous in that an intermittent preparation of the ground may be provided. Operating the scarifier based on the first set of data may be advantageous in that an energy efficient solution may be obtained, since information may be given based on the data when and when not to use devices such as a ground preparing device. This may also be advantageous since this will provide information regarding the ground and if it is suitable to have the scarifier interact with the ground or not, e.g. if obstacles, such as rocks, roots, tree stumps or other obstacles are in the way. Hence, obstacles that may otherwise interfere with the scarifier, the scarification (e.g. mounding or any other process for preparing the ground) and/or may damage the scarifier, may be identified and the planting system may operate the scarifier accordingly.

The scarifier may be configured to analyze at least one property of the ground, wherein the scarifier may be communicatively coupled to the actuator and configured to send a second set of data of the at least one property of the ground to the actuator, and wherein the actuator is configured to operate the at least one plant arm based on at least one of the first and second set of data. By having the scarifier analyze the ground, the scarifier may detect a resistance and/or a counter force when interacting with the ground. For example, the scarifier may be dragged into the ground during operation and a counter force, or resistance, acting on the scarifier from the ground may be detected. It will be appreciated that the scarifier may interact with the ground in other ways, for example a rotating action of the scarifier affecting the ground and a resistance in the rotating force or counter force when rotating may be detected. The scarifier may furthermore detect the counter force acting on the scarifier from the ground when lowering the scarifier into the ground. The detection may be performed by sensors indicating the counter force or resistance. The actuator may be operatively coupled to a hydraulic system and the resistance or counter force may, as an example, be determined from changes in pressure in the hydraulic system.

This may be advantageous in that data associated with the ground based on physical interaction with the ground may be determined. It may be advantageous in that data associated with at least one property of the ground may be determined at a known location relative the at least one plant arm, since the location of the scarifier and the at least one plant arm may be known. This may be advantageous in that a solution with better accuracy may be provided, since the determination of when and when not to use the planting device may be based on either one, or both of, the first set of data (from the ground analyzing device) and the second set of data (from the scarifier).

The planting system may comprise two plant arms. This may be advantageous in that an even higher planting efficiency may be achieved.

The plant feeding device may further comprise a mechanism configured to accelerate the plant seedlings during an initial phase of a feed of the plant seedlings to the at least one plant arm. This facilitates the transportation of the plant seedlings and increases the transportation speed of the plant seedlings from the plant feeding device to the plant arm.

According to a second aspect of the inventive concept there is provided a vehicle, comprising a planting system according to any one of the preceding embodiments, wherein the at least one plant arm may be arranged at the rear part of the vehicle. This may facilitate the transportation of plant seedlings in combination of providing an increased yield of the plant seedlings when planting. This may be advantageous in that the vehicle or parts of the vehicle may affect the ground in a predetermined way before planting, i.e. the vehicle or parts of the vehicle may prepare the ground before planting. This may be advantageous in that increased mobility may be provided to the planting system.

According to a third aspect of the inventive concept there is provided a method for planting seedlings, wherein the method may be performed by a planting system for arrangement on a vehicle, wherein the planting system comprises at least one plant head configured to penetrate ground, wherein the at least one plant arm may be configured to receive plant seedlings and to guide the plant seedlings to the plant head, and a plant feeding device for arrangement on the vehicle and configured to feed plant seedlings by dropping the plant seedlings to the at least one plant arm, wherein the method may comprise the steps of: in a first stage of a planting process, feeding plant seedlings from the plant feeding device, via the at least one plant arm, to the plant head, by operation of the plant feeding device, and in a second stage of a planting process, penetrating the ground by the plant head and releasing the plant seedlings from the plant head into the ground while the planting system is in motion. The plant seedlings fall from the plant feeding device to the plant head while the plant arm is in motion. The plant head has a fixed position relative the ground when in the second stage of a planting process by the plant arm pivoting around the at least one articulation.

By feeding the plant seedlings by dropping the plant seedlings to the at least one plant arm, it is here meant that the plant seedlings may be released (dropped) from the plant feeding device. In other words, by dropping the plant seedlings to the at least one plant arm it may be meant that the plant seedlings are affected at least partly by gravitation. Hence, gravitation and/or forces due to gravitation may be acting on the plant seedlings in order for the plant seedlings to reach the plant arm(s).

By the plant seedlings falling from the plant feeding device to the plant head while the plant arm is in motion, the planting process may be facilitated. A more time efficient planting process may be enabled by dropping the plant seedling from the plant feeding device to the plant head while the plant arm is in motion.

By the plant arm pivoting around the at least one articulation a facilitated planting process may be provided since the plant head may have a fixed position relative the ground when in the second stage of a planting process. Thus, a more time efficient planting process may be provided, enabling movement of the planting system while planting the plant seedlings.

The method may facilitate transportation of plant seedlings from the plant feeding device to the plant head. This may be advantageous in that the force exerted on the plant seedlings when traveling from the feeding device to the plant head may be limited to the force acting on the plant seedlings due to gravity. It has been observed by the inventor that high external forces acting on the plant seedlings may affect the plant seedling negatively and may damage them. Hence, this may decrease the amount of damaged plant seedlings and hence it may increase the plant seedlings possibility of surviving. This may provide an increased yield of the plant seedlings, since external forces other than forces acting on the plant seedling due to gravitation may affect the plant seedling negatively by damaging them.

The method may further comprise the steps of: obtaining data of at least one property of the ground, and controlling the steps of feeding plant seedlings from the plant feeding device, via the at least one plant arm, to the plant head, by operation of the plant feeding device, penetrating the ground by the plant head and releasing the plant seedlings from the plant head into the ground, based on the data. By the term "obtaining data of at least one property of the ground", it may be meant that a sensor may detect at least one property of the ground. The steps of the method may be synchronized in order for the plant seedling to travel a predetermined way and hence the steps according to the above may be adapted or halted based on the data. This may be advantageous in that at least one property of the ground may be taken into account when controlling the steps according to the method. This may further be advantageous in that equipment, such as the at least one plant arm, may experience less damages if for example, the ground is unsuitable (e.g. large rocks, tree stumps or other similar obstacles are present and may affect the planting, plant arm and plant system negatively) for the at least one plant arm to penetrate. The method may further be advantageous in that an alternative planting position may be chosen wherein the alternative planting position may be better suited for planting.

This may also be advantageous in that the yield of plant seedlings surviving the plantation may improve further if the planting position may be adapted to at least one property of the ground.

The method may further comprise the step of: loading plant seedlings into at least one plant holder when in a pre-stage of planting, wherein the pre-stage of planting occurs prior to the first stage of planting. This may advantageous in that plant seedlings may be continuously provided to the plant feeder.

The method may further comprise the step of accelerating the plant seedlings during an initial phase of a feed of the plant seedlings to the at least one plant arm. For example, the step of accelerating the plant seedlings may include accelerating the plant seedlings pneumatically or hydraulically, e.g. by letting pressurized air and/or liquid act on the plant seedlings. The mechanism may act periodically, i.e. the mechanism may act each time a plant seedling is to be released from the plant feeding device. This may provide an increased yield of the plant seedlings and/or an increased speed of the transportation of plant seedlings from the plant feeding device to the at least one plant arm.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

The figures are not necessarily to scale, and generally only show parts that are necessary in order to elucidate the inventive concept, wherein other parts may be omitted or merely suggested.

DETAILED DESCRIPTION

The present disclosure relates to a planting system for planting plant seedlings and a method thereof.

Figure 1:
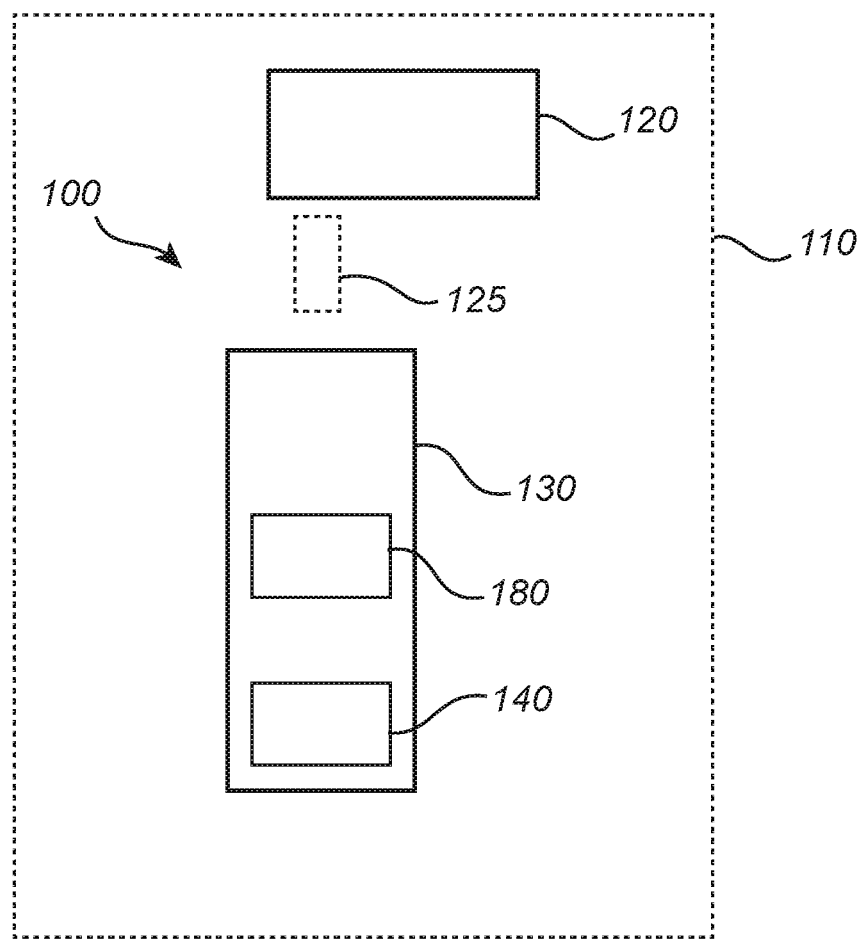
FIG. 1 schematically illustrates a planting system 100 in which embodiments may be implemented, FIG. 2 schematically illustrates a perspective view of the planting system 100 according to an embodiment of the present invention, FIG. 3 schematically illustrates a perspective view of the plant feeding device 120 according to an embodiment of the present invention, FIG. 4 schematically illustrates a perspective view of the plant holder 170 according to an embodiment of the present invention, FIGS. 5a-5b schematically illustrate a perspective view of the planting system 100 according to an embodiment of the present invention, FIG. 6 schematically illustrates a perspective view of the ground analyzing device 200 according to an embodiment of the present invention, FIG. 7 schematically illustrates a side view of the planting system 100 arranged on a vehicle 110 according to an embodiment of the present invention, FIG. 8 schematically illustrates a perspective view of the planting system 100 arranged on a vehicle 110 according to an embodiment of the present invention, and FIG. 9 schematically illustrates an outline of the method 300 according to an embodiment of the present invention.
Figure 2:
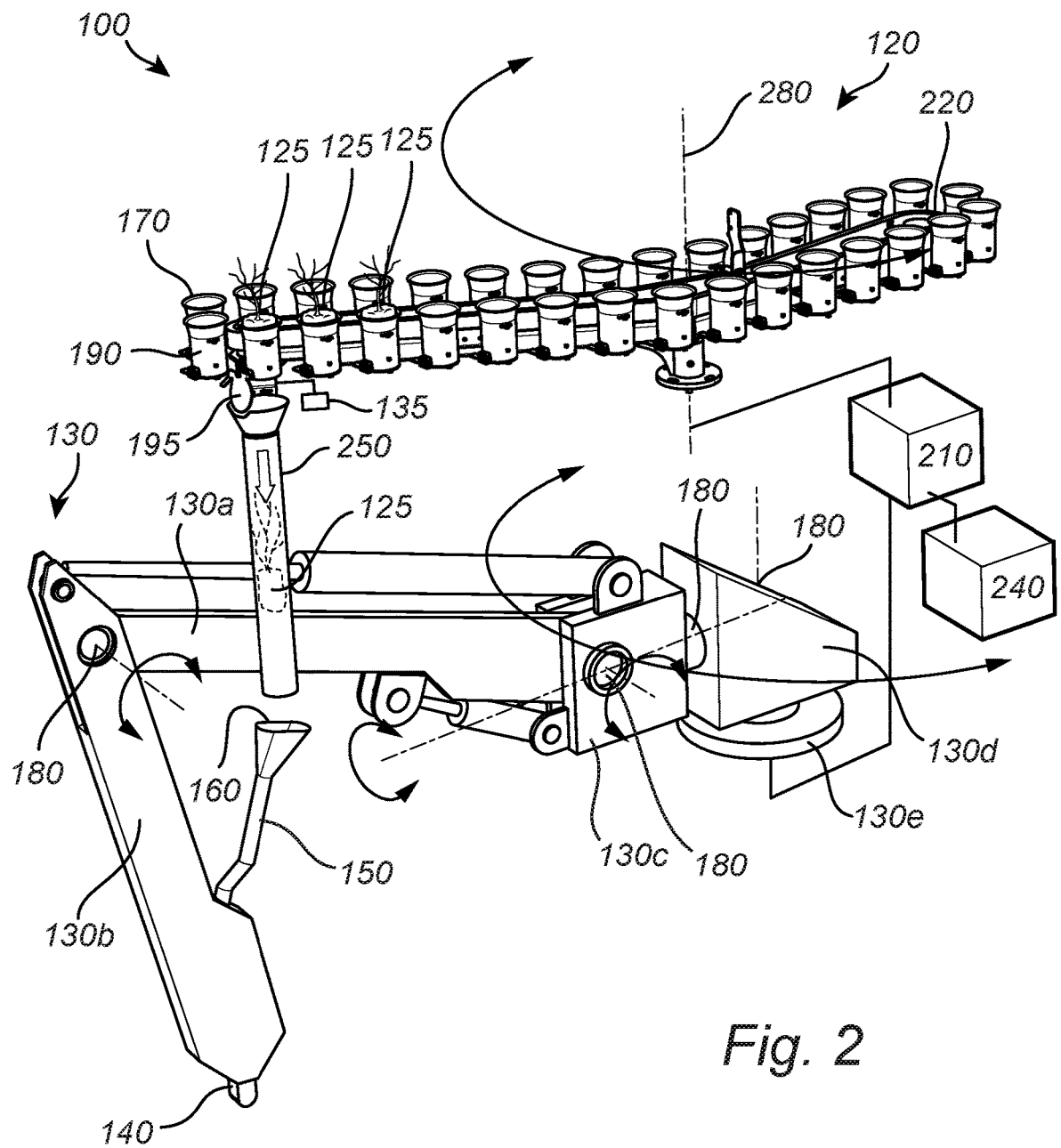

FIG. 1 schematically illustrates a planting system 100 for arrangement on a vehicle 110. The planting system 100 may comprise at least one plant arm 130 comprising a plant head 140 configured to penetrate ground. The at least one plant arm 130 may comprise at least one articulation 180 and may be configured to receive plant seedlings 125 and to guide the plant seedlings 125 to the plant head 140. The planting system 100 may comprise a plant feeding device 120 for arrangement on the vehicle 110 and may be configured to feed plant seedlings 125 to the at least one plant arm 130 by gravitation. The planting system 100 may, in a first stage of a planting process, be configured to feed plant seedlings 125 from the plant feeding device 120, via the at least one plant arm 130, to the plant head 140, by operation of the plant feeding device 120. The planting system 100 may, in a second stage of a planting process, be configured to operate the at least one plant arm 130 by penetrating the ground by the plant head 140 and release the plant seedlings 125 from the plant head 140 into the ground. FIG. 2 schematically illustrates a perspective view of the planting system 100. The plant arm 130 may comprise two or more sections. The plant arm may comprise a first arm section 130a and second arm section 130b. The second arm section 130b may be pivotally attached to the first arm section 130a. An articulation 180 may be arranged between the first arm section 130a and the second arm section 130b. The second arm section 130b may be pivotally attached to the first arm section 130a such that the second arm section 130b may pivot around the articulation 180. In other words, the pivot point of the second arm 130b to the first arm 130a may constitute the articulation 180.

The plant arm 130 may further comprise an arm link 130c. The first arm section 130a may be pivotally attached to the arm link 130c. The articulation 180 may be arranged between the first arm section 130a and the arm link 130c. The first arm section 130a may be pivotally attached to the arm link 130c such that the first arm section 130a may pivot around the articulation 180. In other words, the pivot point of the first arm section 130a to the arm link 130c may constitute the articulation 180.

The plant arm 130 may further comprise an arm base 130d. The arm link 130c may be attached to the arm base 130d. The arm link 130c may be pivotally attached to the arm base 130d. The at least one articulation 180 may be arranged between the arm link 130c and the arm base 130d. The arm link 130c may be pivotally attached to the arm base 130d such that the arm link 130c may pivot around the articulation 180. In other words, the pivot point of the arm link 130c to the arm base 130d may constitute the articulation 180.

The plant arm 130 may comprise a fastening arrangement 130e for arrangement on a vehicle. The arm base 130d may be pivotally attached to the fastening arrangement 130e. The articulation 180 may be arranged between the arm base 130d and the fastening arrangement 130e. The arm base 130d may be pivotally attached to the fastening arrangement 130e such that the arm link 130c may pivot around the articulation 180. In other words, the pivot point of the arm base 130d to the fastening arrangement 130e may constitute the articulation 180. The arm link 130c may be fixedly attached to the arm base 130d. The arm link 130c and the arm base 130d may be rotatably attached to the fastening arrangement 130e. The arm link 130c and the arm base 130d may be pivotally attached to the fastening arrangement 130e such that the arm link 130c and arm base 130d may pivot around the articulation 180.

In FIG. 2 the plant feeding device 120 is also shown. The plant feeding device 120 may comprise a plurality of plant holders 170 for holding plant seedlings 125. Each plant holder 170 may comprise a side wall 190 and a bottom lid 195. The planting system 100 may be configured to feed the plant seedlings 125 from the plant feeding device 120, via the plant arm 130, to the plant head 140, by operation of the plant feeding device 120. The plant feeding device 120 may release the plant seedlings 125 such that the plant seedlings 125 fall via the at least one plant arm 130, to the plant head 140. The plant seedlings 125 may fall by gravity. In other words, the plant seedlings 125 may be fed to the plant arm 130 by gravitation.

The plant arm 130 may comprise a plant channel 150 for receiving the plant seedlings 125 and for guiding the plant seedlings 125 to the plant head 140. The plant channel 150 may comprise a flared opening 160 for receiving the plant seedlings 125.

The plant feeding device 120 may further comprise a mechanism 135 configured to accelerate the plant seedlings 125 during an initial phase of a feed of the plant seedlings 125 to the plant arm 130 by applying a fluid (e.g. pressurized air) on the plant seedlings 125 to initiate an acceleration of said plant seedlings 125. This may facilitate the transportation of plant seedlings 125 from the plant feeding device 120 to the at least one plant arm 130, and may further increase the speed of planting the plant seedlings 125.

The plant feeding device 120 may be articulated, and may comprise an articulation 280.

The feeding device 120 may comprise a guiding device 250 for guiding the plant seedlings 125. The guiding device 250 may be configured to guide the plant seedlings 125 after the plant seedlings 125 are released from the plant holder 170. The guiding device 250 may have a flared opening facing the plant holder 170. This may facilitate for plant seedlings 125 to enter the guiding device 250. The guiding device 250 may guide the plant seedlings 125 from the plant holder 170 to the plant arm 130.

The plant arm 130 and/or the plant channel 150 may have a bent shape in order to facilitate the falling of the plant seedlings 125 from the guiding device 250 to the plant channel 150.

An actuator 210 may be operatively connected to the plant arm 130 and the plant feeding device 120. The actuator 210 may control the plant arm 130 and the plant feeding device 120. The actuator 210 may control the plant arm 130 and the plant feeding device 120 hydraulically or electrically.

A control unit 240 may control the actuator 210. The control unit 240 may control any one of the plant arm 130 and the plant feeding device 120. In FIG. 2, the actuator 210 is operatively coupled to the plant arm 130 and the plant feeding device 120. The control unit 240 in FIG. 2 is controllably connected to the actuator 210, meaning that that the control unit 240 may control the actuator 210. However, the control unit 240 may be operatively connected to any one of the plant arm 130 and the plant feeding device 120.

Figure 3:
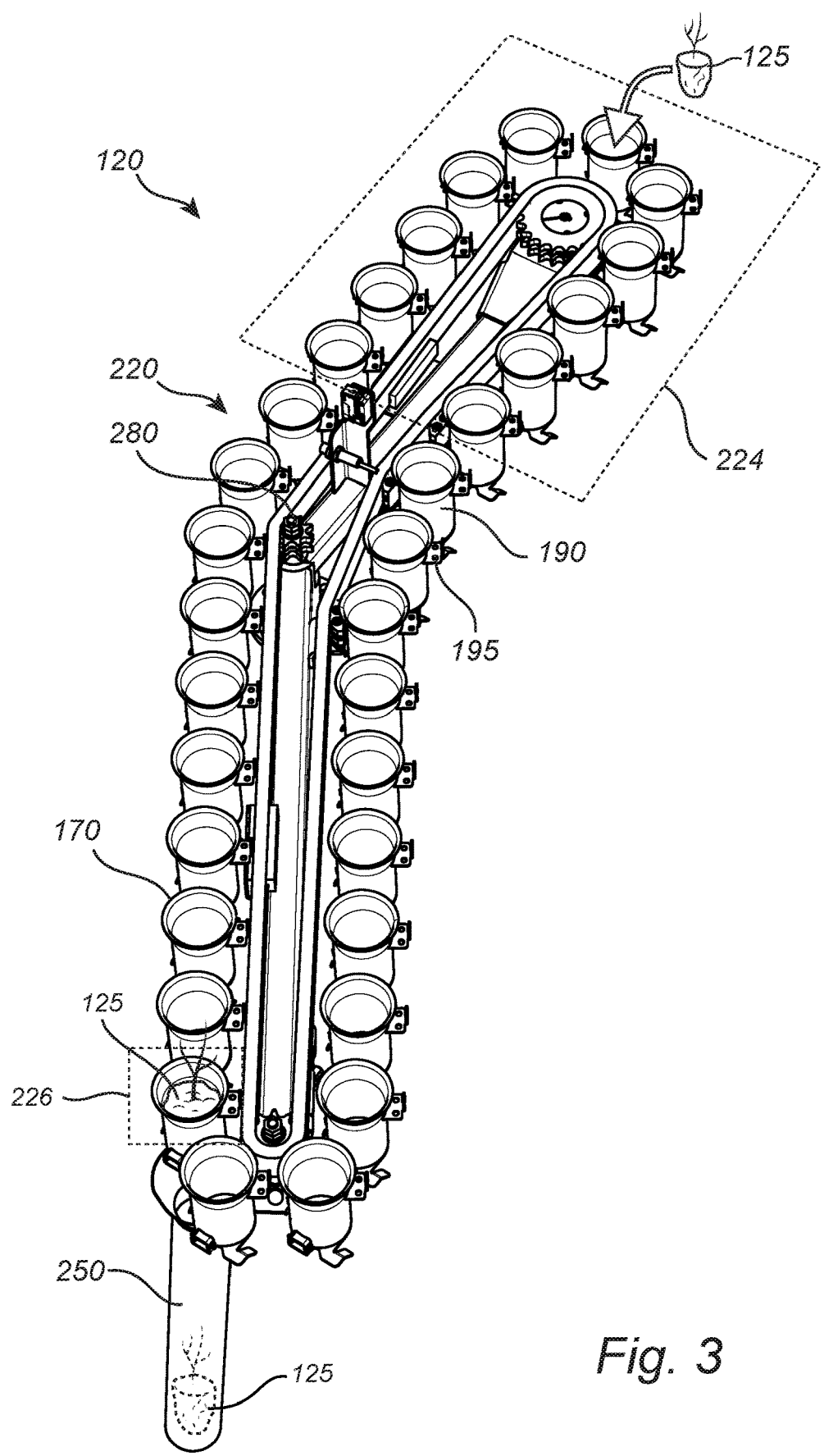

In FIG. 3, the plant feeding device 120 is shown. The plant feeding device 120 may comprise a circulating transport device 220 comprising the plurality of plant holders 170, wherein the circulating transport device 220 may be configured to repeatedly transport the plant holders 170 from a first position 224, in which the plant holders 170 may be arranged to receive a plant seedling 125, to a second position 226, in which the plant holders 170 may be configured to release the plant seedling, and back to the first position 224.

In the first position, the plant holders 170 may receive a plant seedling 125 and the plant seeding 125 may then be transported to the second position 226 where the plant seedling 125 may be released. The second position 226 may therefore be the position of the plant seedling 125 when the first stage of planting is initiated. The transportation of plant seedlings 125 from the first position 224 to the second position 226 may therefore be in a pre-stage of a planting process, wherein the pre-stage of a planting process may be a step prior to the first stage of the planting process.

When in use, the plant holders 170 may rotate around the circulating transport device 220. The circulating transport device 220 may have an elongated shape comprising two ends. The first position 224 may be located in one end of the circulating transport device 220. The second position 226 may be located substantially at the opposite end to the first position 224 of the circulating transport device 220.

In FIG. 3, a first plant seeding 125 has been released and is falling within the guiding device 250. The circulating transport device 220 in FIG. 3 has transported a first plant holder 170, previously holding a first plant seedling 125, from the second position 226 by partly rotating. A second plant holder 170 has been transported by the plant feeding device 120 into the second position 226 to drop a second plant seedling 125 by opening the bottom lid 195 of the second plant holder 170. With continued reference to FIG. 3, a new plant seedling 125 may be added to the plant holder 170 in the first position 224. The first position 224 is only exemplified and not limited to the depicted area. Hence, the plant seedlings 125 may be repeatedly fed to the plant arm 130. The plant holders 170 may comprise a side wall 190 for keeping the plant seedlings 125 in an upright position, and the bottom lid 195 that may be configured to open for releasing the plant seedlings 125 when the plant holders 170 are in the second position 226. The plant feeding device 120 may be articulated, and may comprise an articulation 280.

Figure 4:
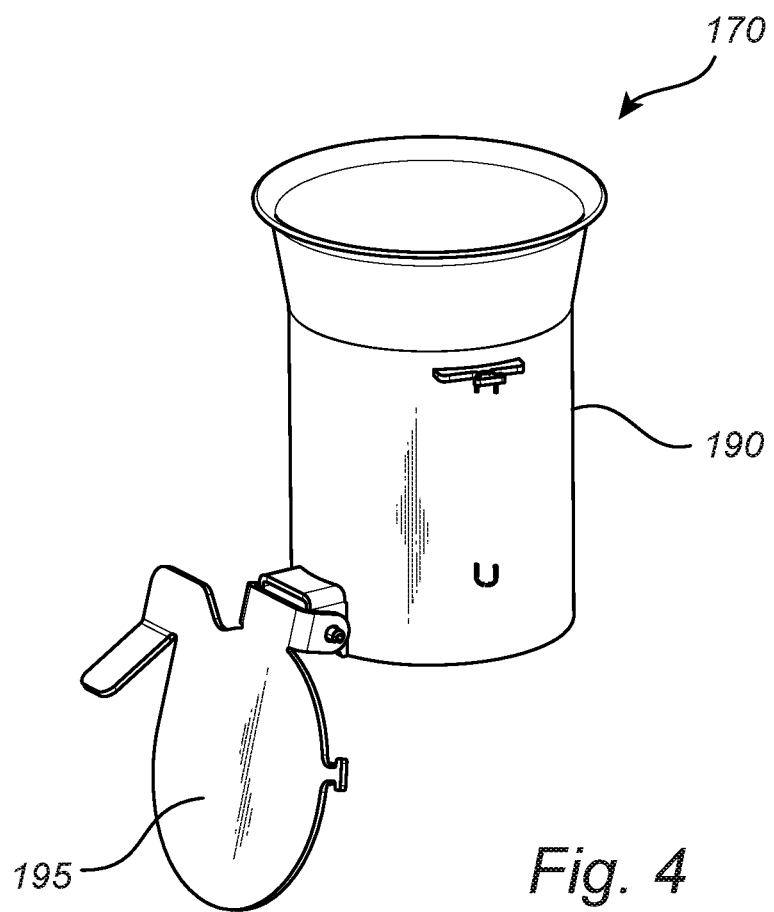

In FIG. 4, a plant holder 170 is shown. The plant holder 170 comprises a side wall 190 for keeping the plant seedlings 125 in an upright position, and further comprises a bottom lid 195.

Figure 5A:
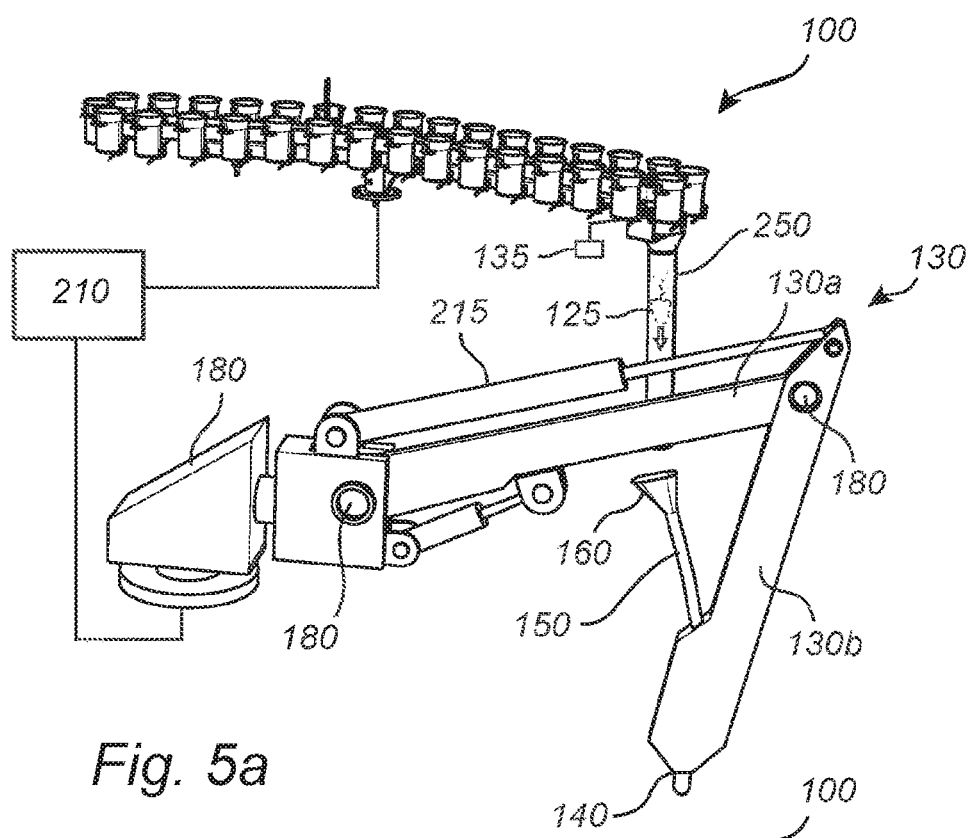
Figure 5B:
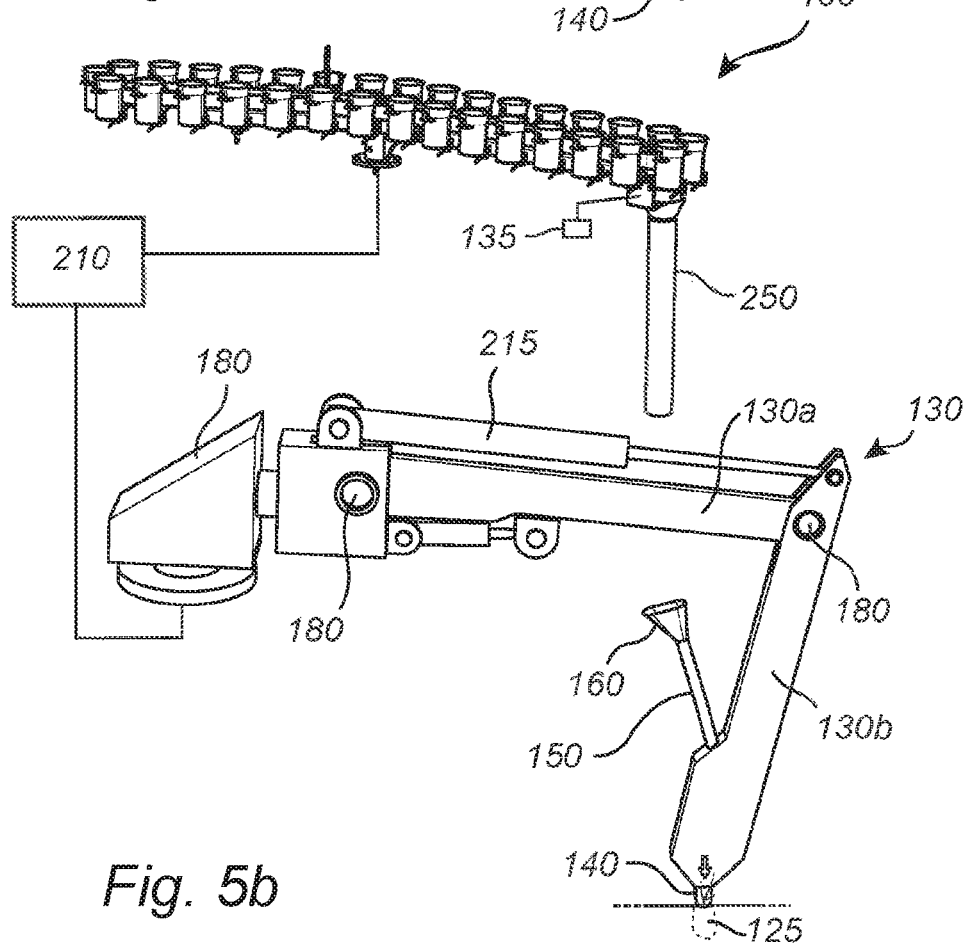

FIGS. 5a-5b illustrate perspective views of the planting system 100. With reference to FIG. 5a, the planting system 100 is in a first stage of a planting process, and may be configured to feed plant seedlings 125 from the plant feeding device 120, via the plant arm 130, to the plant head 140, by operation of the plant feeding device 120. By releasing the plant seedlings 125 from the plant feeding device 120, the plant seedlings 125 may fall into the plant channel 150 before reaching the plant head 140. The process of the seedlings 125 falling may occur while the plant arm 130 is in motion. The plant feeding device 120 may further comprise a mechanism 135 configured to accelerate the plant seedlings 125 to the at least one plant arm 130.

With reference to FIG. 5b, the planting system 100 is in a second stage of a planting process, and may be configured to operate the at least one plant arm 130 by penetrating the ground by the plant head 140 and release the plant seedlings 125 from the plant head 140 into the ground. The plants seedlings 125 may fall from the plant feeding device 120, via the at least one plant arm 130, to the plant head 140, in an interstitial stage of a planting process. This interstitial stage of the planting process may be in-between the first stage of the planting process and the second stage of the planting process. The plant arm 130 may pivot around the at least one articulation 180 during the first stage of a planting process. The plant arm 130 may pivot around the articulation 180 when the planting system 100 alternates between the first stage of the planting process and the second stage of the planting process. The plant arm 130 may pivot around the articulation 180 when the planting system 100 alternates between the first stage, the second stage, and the interstitial stage of the planting process. The plant arm 130 may pivot around the at least one articulation 180 such that the second arm section 130b may pivot relative the first arm section 130a during any one of the first stage, the second stage and the intersitial stage of a planting process. The plant arm 130 may pivot around the articulation 180 such that the second arm section 130b may pivot relative the first arm section 130a when alternating between the first stage, the second stage, and the interstitial stage of the planting process. It should be understood that the plant arm 130 may pivot around any one of said articulation 180.

The first planting stage of the planting process may comprise a receiving state. In the receiving state, the distance between the plant feeding device 120 and the plant channel 150 may be relatively short. For example, the plant seedling 125 may fall from the plant feeding device 120 to the plant channel 150 along a distance shorter than 50 cm, preferably shorter than 20 cm, and even more preferably shorter than 10 cm. The distance between the plant feeding device 120 and the plant channel 150, when the planting system 100 is in the receiving state, may preferably be larger than 5 cm. Most preferably, the plant channel 150 and the plant feeding device 120 may not be in physical contact. The plant feeding device 120 may comprise the guiding device 250. The plant channel 150 may comprise a flared opening 160. The flared opening may face the guiding device 250 and be arranged to receive the plant seedlings 125.

The planting system 100 in FIG. 5a may be in the receiving state, wherein the plant seedlings 125 released from the plant feeding device 120 may fall into the plant arm 130. The plant seedlings 125 may fall into the plant channel 150. The plant feeding device 120 may comprise the guiding device 250. The plant seedlings may fall through the guiding device 250 before reaching the plant arm 130. The plant seedlings 125 may fall through the guiding device 250 before reaching the plant channel 150. The plant feeding device 120 may further comprise a mechanism 135 configured to accelerate the plant seedlings 125 during an initial phase of a feed of the plant seedlings to the at least one plant arm 130. In other words, the plant seedlings 125 may initially be pushed by the mechanism 135, e.g. by pressurized air being released onto the plant seedlings 125 creating an initial acceleration of said plant seedlings 125. By initial is meant a push of the plant seedlings 125 in the beginning of the fall of the plant seedlings 125. The plant arm 130 may pivot around the at least one articulation 180 when the plant seedling 125 is released and fall into the plant arm 130. The plant arm 130 may pivot when the plant seedling 125 falls within the plant arm 130. The plant arm 130 may pivot when the plant seedling 125 falls and reaches the plant head 140.

The second stage of a planting process may comprise a planting state. In FIG. 5b, the planting system 100 may be in the planting state, wherein the plant seedlings 125 may have fallen from the plant feeding device 120 to the plant head 140. The plant seedlings 125 may have fallen from the plant feeding device 120 into the plant channel 150 before the plant seedlings 125 reach the plant head 140. The plant arm 130 may penetrate the ground in the planting state. The plant seedlings 125 may be released into the ground when the plant arm 130 is in the planting stage. The first stage of a planting process may comprise a moving state wherein the moving state may be after the receiving state and before the planting state.

Between the position of the plant arm 130 in FIGS. 5a and 5b, the planting system 100 may be in the moving state. Here, the plant arm 130 moves, such that the planting system 100 goes from the receiving state to the planting state. The plant seedlings 125 may fall within the plant arm 130 while the planting system 100 is in the moving state. The plant seedlings 125 may fall at least partly from the plant feeding device 120 to the plant arm 130. The plant seedlings 125 may fall to the plant head 140 while the planting system 100 is in said moving state. The plant seedlings 125 may fall at least partly from the plant feeding device 120 to the plant head 140 during at least one of the receiving state, the moving state and the planting state. The plant arm 130 may pivot around the at least one articulation 180 in the second stage of a planting process.

In the receiving state, the distance between the plant head 140 and the first arm section 130a may be smaller than in the planting state. The distance between the plant channel 150 and the plant feeding device 120 may be smaller when in the receiving state compared to the planting state.

The second stage of a planting process may comprise a retracting state. The planting system 100 may be in the retracting state after the planting state, wherein the plant arm 130 after planting may retract back to the receiving state. The plant arm 130 may pivot around the articulation 180 when the planting system 100 alternates between the first stage and the second stage of a planting process.

The plant arm 130 may comprise at least one actuator 215 arranged to control the plant arm 130. The at least one actuator 215 may be controlled by at least one of the actuator 240 and the control unit 210.

Figure 6:
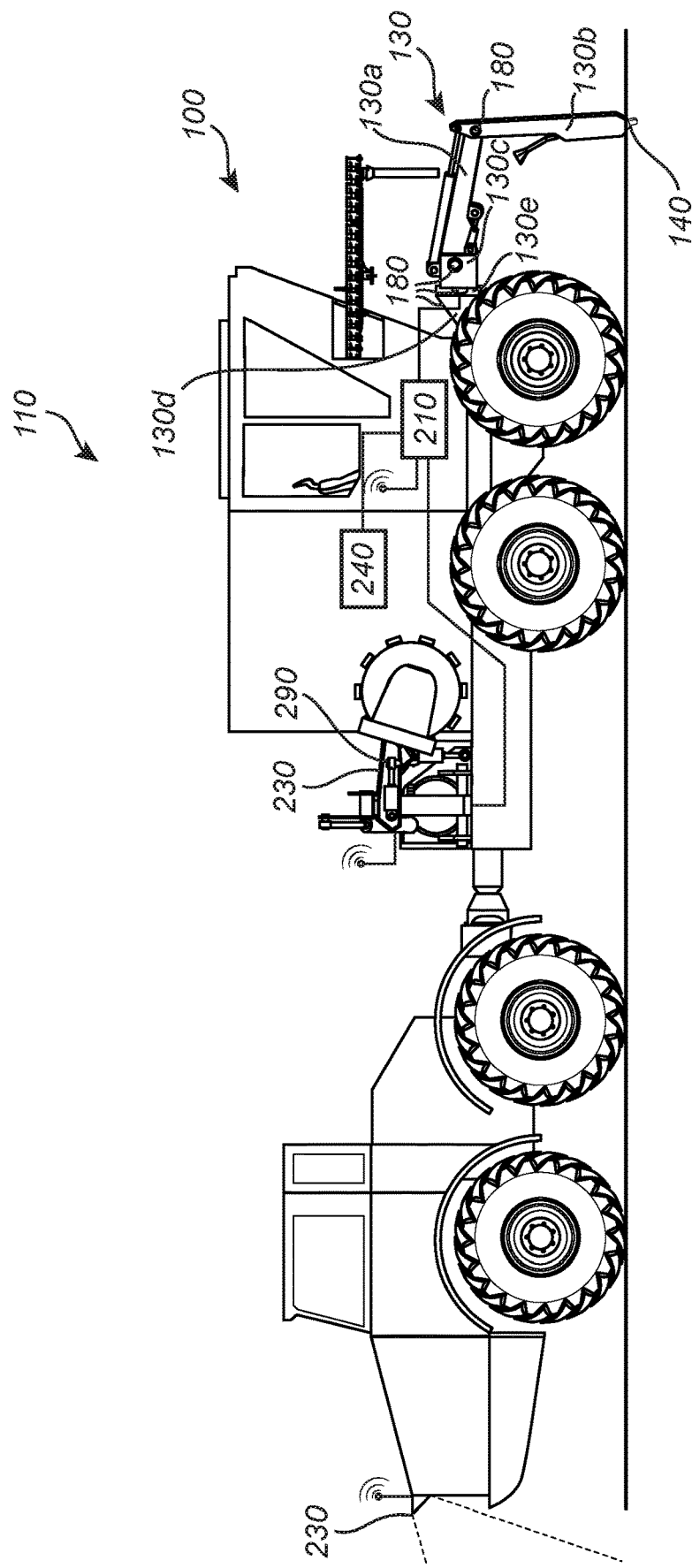

FIG. 6 illustrates the planting system 100 arranged onto a vehicle 110. The planting system 100 may be in motion and the at least one plant arm 130 may penetrate the ground for planting plant seedlings 125. The plant head 140 may have a fixed position relative the ground when planting. The plant head 140 may have a fixed position relative the ground when in the second stage of a planting process. While alternating between the first and second stages of the planting process, the plant arm 130 may pivot around the at least one articulation 180 so that at least part of the plant head 140 may have a fixed position relative the ground when penetrating the ground. The articulation of the plant arm 130 may enable movement of the vehicle 110 when the planting system 100 is in the second stage of the planting process. The articulation of the plant arm 130 may enable movement of the vehicle 110 when planting. In other words, the articulation 180 of the plant arm 130 may enable planting while moving the planting system 100. The articulation 180 of the plant arm 130 may enable the planting system 100 to be in the second stage of the planting process while at least one of the planting system 100 and the vehicle 110 is moving.

The plant arm 130 may pivot around the articulation 180 such that at least one of the following is performed: the second arm section 130b pivots relative the first arm section 130a around the at least one articulation 180, the first arm section 130a pivots relative the arm link 130c around the at least one articulation 180, the arm link 130c pivots relative the arm base 130d around the at least one articulation 180, and the arm base 130d pivots relative the fastening arrangement 130e around the at least one articulation 180.

It should be understood that part(s) of the plant arm 130 may be connected. For example, the arm link 130c and the arm base 130d may be fixedly connected such that the arm link 130c and the arm base 130d may pivot together relative the fastening arrangement 130e around the articulation 180.

As also seen in FIG. 6, the planting system 100 may comprise a ground analyzing device 230 configured to analyze at least one property of the ground. The planting system 100 may comprise an actuator 210 communicatively coupled to the ground analyzing device 230. The ground analyzing device 230 may be configured to send a first set of data of the at least one property of the ground to the actuator 210, and wherein the actuator 210 may be configured to operate the plant feeding device 120 and the plant arm 130 based on the first set of data.

The ground analyzing device 230 may be configured to send a first set of data of the at least one property of the ground to the control unit 240, and wherein the control unit 240 may be configured to operate the plant feeding device 120 and the plant arm 130 based on the first set of data.

The control unit 240 may be configured to evaluate a condition for planting seedlings, wherein the condition may be a function of the at least one property of the ground. In other words, the condition for planting the plant seedlings 125 may be evaluated by the control unit 240, wherein the condition may be based on the at least one property of the ground.

The control unit 240 may be configured to operate the plant arm 130 based on the condition. The control unit 240 may be configured to operate the plant arm 130 using the articulation 180 based on the condition.

The condition may be associated with a force which the control unit 240 exerts on the plant arm 130 in order to penetrate the ground and for the plant arm 130 to reach a predetermined planting depth. In other words, the condition may be associated with a force which the control unit 240 uses when controlling the plant arm 130 in order to penetrate the ground and for the plant arm 130 to reach a predetermined planting depth. Analogously, the condition may be associated with a force which the actuator 210 exerts on the at least one plant arm 130 in order to penetrate the ground and for the plant arm 130 to reach a predetermined planting depth. Hence, the force needed for the plant arm 130 to reach a predetermined planting depth may be deduced from the evaluated condition(s). For example, the property(ies) of the ground may contain at least one of information about the ground topography, objects on the ground, ground hardness, and/or other information that may be of value to perform the planting of plant seedlings. Hence, when evaluating the condition(s), anyone of these may be considered and the force may be determined in order to reach the predetermined planting depth. The condition(s) may be associated with a change in a planting position which any one of the control unit 240 and actuator 210 may use to operate the at least one plant arm 130 in order plant the plant seedling 125. In other words, the condition may be associated with instructions to change planting position which the control unit 240 uses to control the plant arm 130 to change planting position. In other word, the ground analyzing device may detect at least one property of the ground that indicates unsuitable planting conditions, wherein the control unit 240 may determine an adjusted planting position.

The ground analyzing device 230 may comprise a non-invasive measurement device configured to measure at least one property of the ground without physically contacting the ground during measurement. In other words, the ground analyzing device 230 may comprise a non-invasive measurement device configured to measure the at least one property of the ground without coming into contact with the ground during measurement. The ground analyzing device 230 may, for example, comprise at least one of a camera device, a radar device, a lidar device and an ultrasonic device. The ground analyzing device 230 may be arranged on the vehicle 110. The non-invasive measurement device may be arranged in the front, on the side, on top of or under the vehicle 110, or in any other position suitable for the non-invasive measurement device to perform its measurement.

The data associated with the at least one property of the ground may comprise at least one of an image, a radar signal, a lidar signal and an ultrasonic signal.

The ground analyzing device 230 may comprise an invasive measurement device configured to come into contact with the ground, wherein the data associated with the at least one property of the ground may be based on the contact between the measurement device and the ground.

The planting system 100 may further comprise a scarifier 290 configured to prepare the ground for planting plant seedlings. The scarifier 290 may be in contact with the ground for preparing the ground. The scarifier 290 may prepare the ground before planting. In other words, the scarifier 290 may be configured to prepare the ground prior to planting. The ground analyzing device 230 may comprise the scarifier 290. In other words, the invasive measurement device may comprise the scarifier 290.

The actuator 210 may be operatively coupled to the scarifier 290 and configured to operate the scarifier 290 based on the first set of data. The ground analyzing device 230 may comprise an invasive measurement device, such as the scarifier 290.

The scarifier 290 may be configured to analyze at least one property of the ground, wherein the scarifier 290 may be communicatively coupled to the actuator 210. The scarifier 290 may be configured to send a second set of data of the at least one property of the ground to the actuator 210. The actuator 210 may be configured to operate the at least one plant arm 130 based on at least one of the first and second set of data. The scarifier 290 may be configured to analyze the ground by analyzing the resistance to the ground while preparing the ground.

The planting system 100 may perform at least one of an intermittent planting and an intermittent preparation of the ground. By the term "intermittent planting", it may here be meant that the planting may be performed periodically or irregularly. In other words, the planting may be performed at regular or irregular intervals. The intermittent planting may be based on at least one of the at least one property of the ground and a first planting position.

The planting system 100 may comprise a global navigation satellite system, such as at least one of GPS, GLONASS, Galileo and BeiDou.

The first planting position or a set of planting data may be entered manually or the set of planting data may be loaded into the system, wherein the set of planting data may comprise a plurality of planting positions comprising the first planting position. The planting system 100 may analyze the ground using the ground analyzing device 230. The planting system 100 may determine if the first planting position is suitable to plant the plant seedling 125 based on the at least one property of the ground. The planting system 100 may adjust the planting position based on the at least one property of the ground. For example, if the planting system 100 detects that the ground is unsuitable to plant the plant seedling 125 at the first planting position, the first planting position may be corrected to a corrected first planting position close to the first planting position.

The plurality of planting positions may comprise a second planting position, wherein the second planting position may be the next planting position after the first planting position. By the next planting position may be meant that the planting system 100 may plant a first plant seedling 125 on the first planting position and subsequently the planting system 100 may plant a second plant seedling 125 on the second plant position.

The set of ground preparation data may be entered manually or the set of ground preparation data may be loaded into the system, wherein the set of ground preparation data may comprise a plurality of ground preparation spots comprising the first ground preparation spot. The planting system 100 may determine if the first ground preparation spot is suitable to prepare based on the at least one property of the ground. The planting system 100 may adjust the ground preparation spot based on the at least one property of the ground. For example, if the planting system 100 detects that the ground is unsuitable to prepare the ground at the first ground preparation spot, the first ground preparation spot may be corrected to a corrected first ground preparation spot close to the first ground preparation spot.

The plurality of ground preparation spots may comprise a second ground preparation spot, wherein the second ground preparation spot may be the next ground preparation spot after the first ground preparation spot. By the next ground preparation spot may be meant that the planting system 100 may prepare the ground at the first ground preparation spot and subsequently, may prepare the ground at the second ground preparation spot.

The first ground preparation spot may be the same as the first planting position and the second ground preparation spot may be the same as the second planting position. The first and second ground preparation spots may be areas comprising the first and second planting spots, respectively. The first or second ground preparation spots may also comprise a plurality of planting positions.

Figure 7:
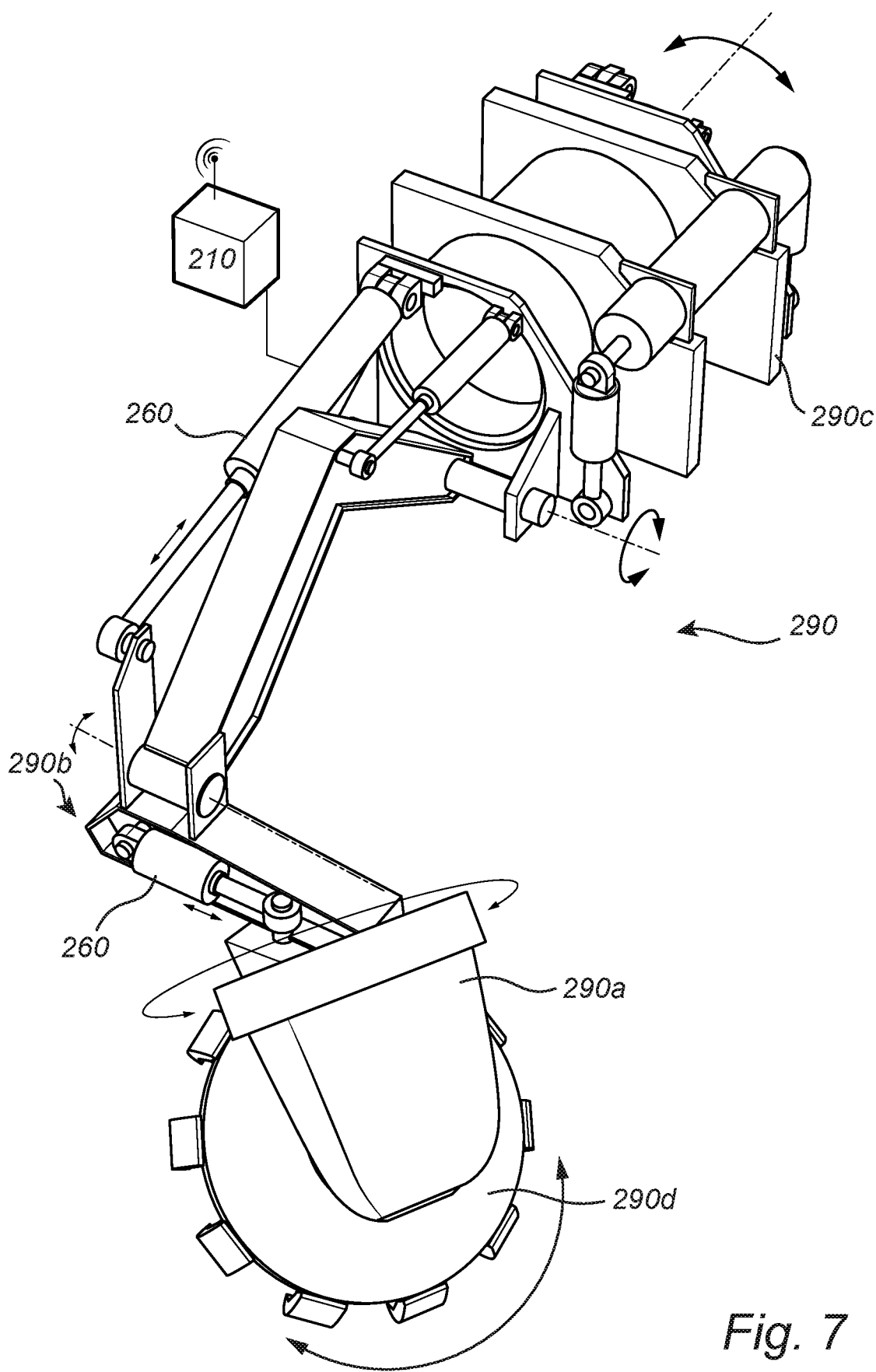

FIG. 7 illustrates a scarifier 290 according to an embodiment. The scarifier 290 may be configured to prepare the ground for planting plant seedlings 120. The scarifier 290 may comprise at least one actuator 260. The scarifier may comprise a scarifier arm 290*b*. The scarifier 290 may comprise a scarifier head 290*a*. The scarifier head 290*a* may be rotatably connected to the scarifier arm 290*b*. The scarifier 290 may comprise a scarifier base 290*c* for arrangement on a vehicle. The scarifier arm 290*b* may be pivotably connected to the scarifier base 290*c*. The scarifier arm 290*b* may be at least one of rotatably and pivotably attached to the scarifier base 290*c*.

The scarifier 290 may comprise a rotating device 290*d*. The rotating device 290*d* may be rotatably connected to the scarifier head 290*a*. The rotating device 290*d* may be arranged to be in contact with the ground for preparing the ground. The rotating device 290*d* may be shaped in different ways known in the art.

The actuator 210 may be operatively coupled to the scarifier 290 and configured to operate the scarifier 290 based on the first set of data.

The control unit 240 may be operatively coupled to the scarifier 290 or communicatively coupled to the actuator 210.

The scarifier 290 may analyze the ground by the control unit 240, which in turn may analyze at least one of a pressure in the actuator 210, a measured pressure by the pressure sensor and a measured force by the force sensor. In other words, the control unit 240 may analyze at least one of the force or pressure acting on the scarifier 290 and the pressure in the actuator 210 when performing an action with the scarifier 290.

An action performed by the scarifier 290 may be any one of pressing the scarifier 290 towards the ground, rotating the rotating device 290*d* when in contact with the ground and dragging the scarifier 290 into the ground.

Figure 8:
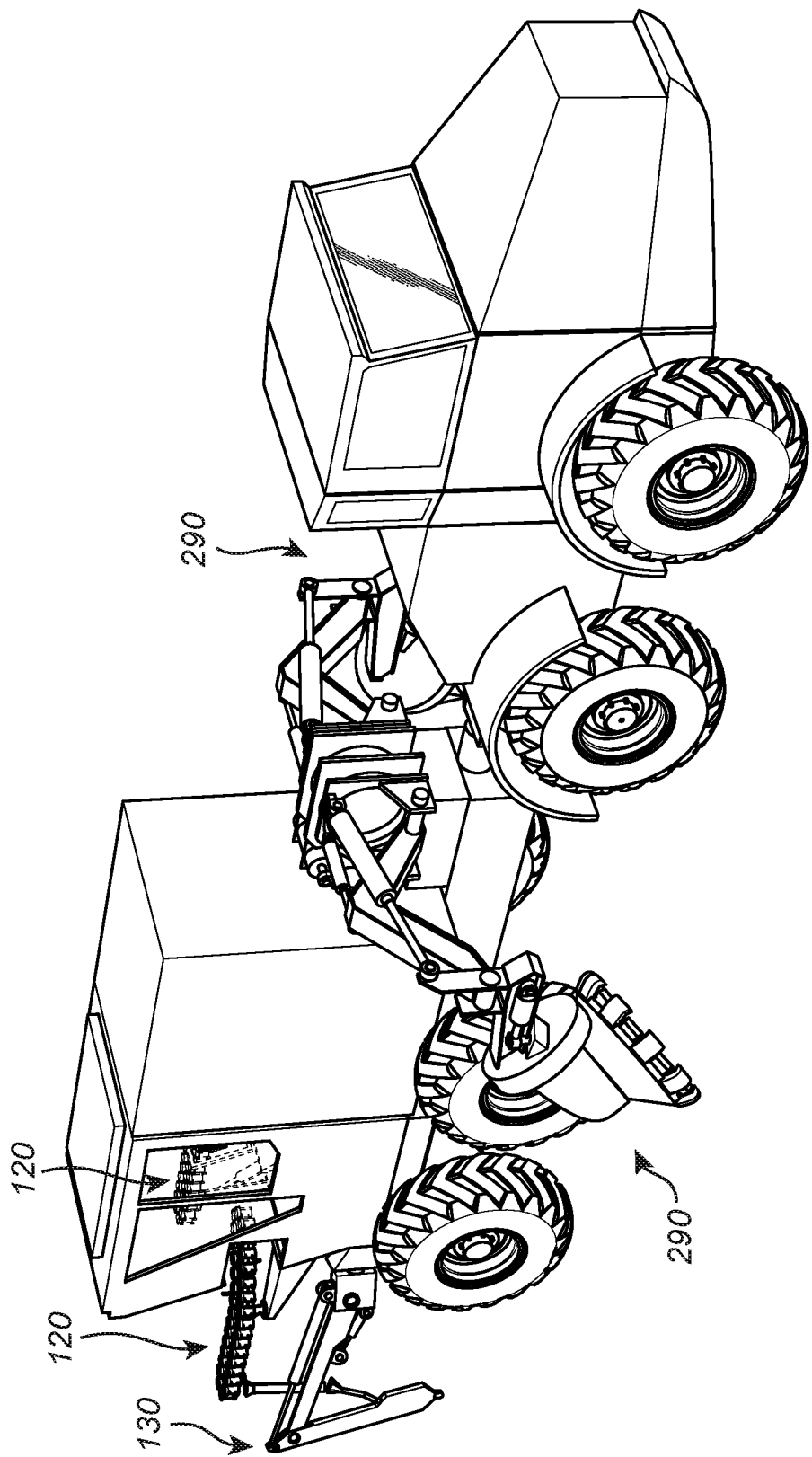

FIG. 8 illustrate the planting system 100 arranged onto the vehicle 110. The at least one plant arm 130 may be arranged at the rear part of the vehicle 110. In FIG. 8, two plant arms 130 are arranged in the rear part of the vehicle 110. The planting system 100 may further comprise two plant feeding devices 120. The planting system 100 may comprise one plant feeding device 120 for each one of the two plant arms 130. In FIG. 8, the planting system 100 comprises two scarifiers 290. The planting system 100 may comprise one scarifier 290 for each plant arm 130.

The plant arm(s) 130 may be arranged such that the scarifier 290 may prepare the ground prior to planting by the planting system 100 using the plant arm(s) 130.

For example, the plant arm(s) 130 may be arranged in the rear part of the vehicle 110. By the rear part of the vehicle 110, it may be meant a first section of the vehicle, wherein the first section may be in the aft part of the vehicle 110. The scarifier 290 may be arranged in front of the plant arm(s) 130. In other words, the scarifier 290 may be arranged in front of the first section. The scarifier 290 may be arranged in a second section of the vehicle 110 wherein the second section may be arranged in front of the first section. The scarifier 290 and the at least one plant arm 130 may be arranged substantially at the same lateral position, wherein the lateral position may the position perpendicular to the main direction of travel for the vehicle 110. This may allow the plant arm(s) 130 to plant seedlings 125 in ground prepared by the scarifier 290.

Figure 9:
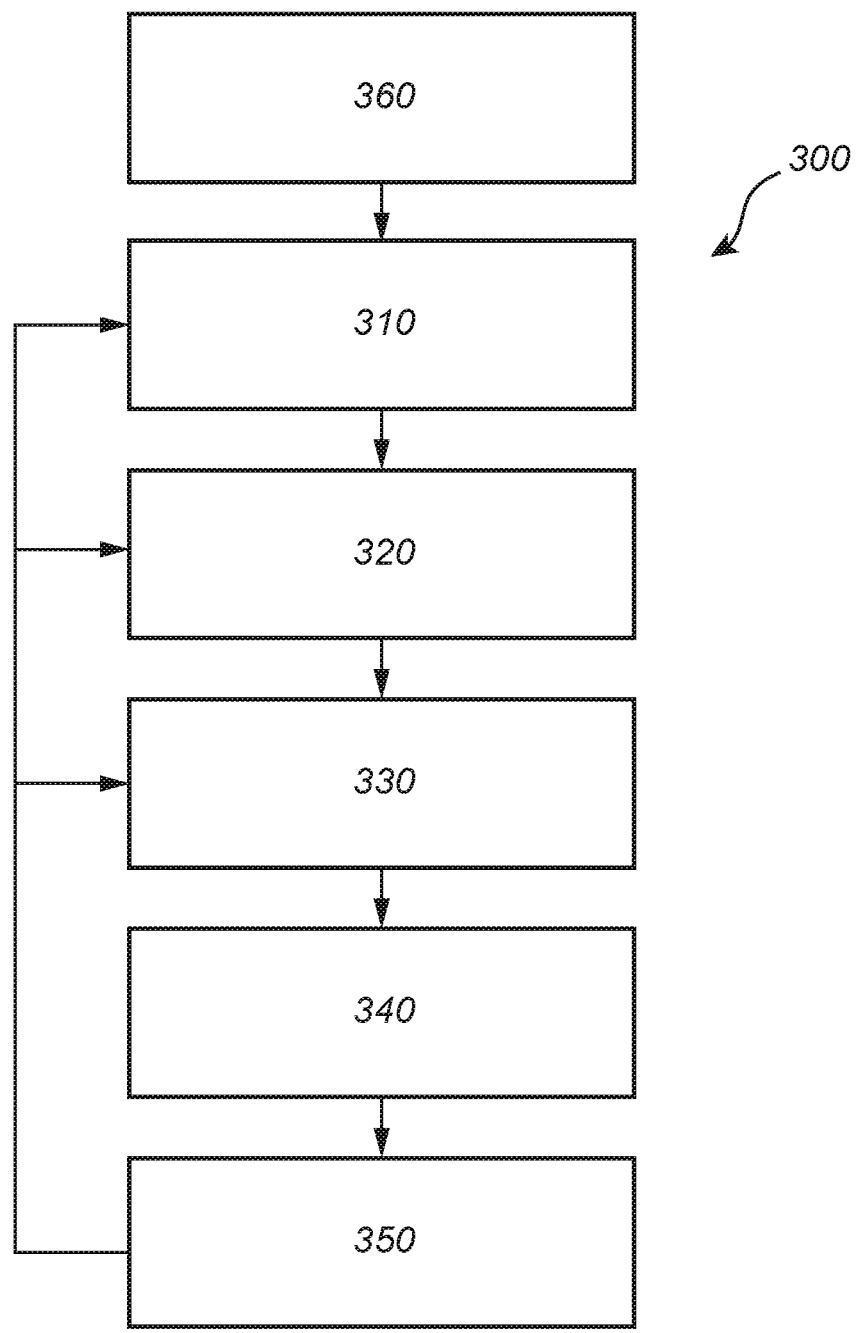

A method 300 for planting seedlings according to the inventive concept will now be described with reference to FIG. 9. For clarity and simplicity, the method will be described in terms of 'steps'. It is emphasized that the steps are not necessarily processes that are delimited in time or separate from each other, and more than one step may be performed at the same time in a parallel fashion.

The method 300 may be performed by a planting system for arrangement on a vehicle, wherein the planting system may comprise at least one plant head configured to penetrate ground, wherein the plant arm(s) may be configured to receive plant seedlings and to guide the plant seedlings to the plant head, and a plant feeding device for arrangement on the vehicle and configured to feed plant seedlings to the plant arm(s) by gravitation.

The method 300 may comprise the step of in a first stage of a planting process, feeding 310 plant seedlings from the plant feeding device via the plant arm(s), to the plant head, by operation of the plant feeding device.

The method 300 may comprise the step of in a second stage of a planting process, penetrating 320 the ground by the plant head and releasing 330 the plant seedlings from the plant head into the ground.

By the method 300 comprising the first and the second stage of a planting process, it may here be meant that the method 300 alternates between the first and second stages of a planting process. By alternating between the first and second stages of a planting process, it may here be meant that the plant arm(s) may be controlled so that it pivots around at least one articulation 180. The plant arm may be controlled so that the distance between the plant channel and the plant feeding device decreases, thereby facilitating the fall of the plant seedling from the plant feeding device to the plant channel. The plant arm(s) may be controlled so that the distance between the plant head and the ground decreases. The plant arm(s) may be controlled so that the plant head penetrates the ground.

Further, the method 300 may comprise the step of obtaining 340 data of at least one property of the ground.

The method 300 may comprise the step of controlling 350 the steps of feeding 310 plant seedlings from the plant feeding device, via the at least one plant arm, to the plant head, by operation of the plant feeding device, penetrating 320 the ground by the plant head, and releasing 330 the plant seedlings from the plant head into the ground, based on the data.

The method may further comprise the step of loading 360 plant seedlings into at least one plant holder 170 when in the pre-stage of a planting process, wherein the pre-stage of a planting process occurs prior to the first stage of planting.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

LIST OF EMBODIMENTS

Embodiment 1. A planting system (100) for arrangement on a vehicle (110), wherein the planting system (100) comprises
at least one plant arm (130) comprising a plant head (140) configured to penetrate ground, wherein the at least one plant arm (130) comprises at least one articulation (180) and is configured to receive plant seedlings (125) and to guide the plant seedlings (125) to the plant head (140), and
a plant feeding device (120) for arrangement on the vehicle (110) and configured to feed plant seedlings (125) to the at least one plant arm (130) at least partially by gravitation,
wherein the planting system (100), in a first stage of a planting process, is configured to feed plant seedlings (125) from the plant feeding device (120), via the at least one plant arm (130), to the plant head (140), by operation of the plant feeding device (120), and
wherein the planting system (100), in a second stage of a planting process, is configured to operate the at least one plant arm (130) by penetrating the ground by the plant head (140) and release the plant seedlings (125) from the plant head (140) into the ground.

Embodiment 2. The planting system (100) according to embodiment 1, wherein the at least one plant arm (130) comprises
a plant channel (150) for receiving the plant seedlings (125) and for guiding the plant seedlings (125) to the plant head (140).

Embodiment 3. The planting system (100) according to embodiment 2, wherein the plant channel (150) comprises a flared opening (160) for receiving the plant seedlings (125).

Embodiment 4. The planting system (100) according to any one of the preceding embodiments, wherein the plant feeding device (120) comprises
a circulating transport device (220) comprising at least one plant holder (170), wherein the circulating transport device (220) is configured to repeatedly transport the at least one plant holder (170) from a first position, in which the at least one plant holder (170) is arranged to receive a plant seedling, to a second position, in which the at least one plant holder (170) is configured to release the plant seedling, and back to the first position.

Embodiment 5. The planting system (100) according to embodiment 4, wherein the at least one plant holder (170) comprises
a side wall (190) for keeping the plant seedlings (125) in an upright position, and
a bottom lid (195) configured to open for releasing the plant seedling when the at least one plant holder (170) is in the second position.

Embodiment 6. The planting system (100) according to any one of the preceding embodiments, further comprising
a ground analyzing device (230) configured to analyze at least one property of the ground, and
an actuator (210) communicatively coupled to the ground analyzing device (230),
wherein the ground analyzing device (230) is configured to send a first set of data of the at least one property of the ground to the actuator (210), and wherein the actuator (210) is configured to operate the plant feeding device (120) and the at least one plant arm (130) based on the first set of data.

Embodiment 7. The planting system (100) according to embodiment 6, wherein the ground analyzing device (230) comprises a non-invasive measurement device configured to measure at least one property of the ground without physically contacting the ground during measurement.

Embodiment 8. The planting system (100) according to any one of the preceding embodiments, further comprising a scarifier (290) configured to prepare the ground for planting plant seedlings.

Embodiment 9. The planting system (100) according to any one of embodiments 6-7, and 8, wherein the actuator (210) is operatively coupled to the scarifier (290) and configured to operate the scarifier (290) based on the first set of data.

Embodiment 10. The planting system (100) according to any one of embodiments 6-7 and 8-9, wherein the scarifier (290) is configured to analyze at least one property of the ground, wherein the scarifier (290) is communicatively coupled to the actuator (210) and configured to send a second set of data of the at least one property of the ground to the actuator (210), and wherein the actuator (210) is configured to operate the at least one plant arm (130) based on at least one of the first and second set of data.

Embodiment 11. The planting system (100) according to any one of the preceding embodiments, wherein the plant feeding device (120) further comprises a mechanism (135) configured to accelerate the plant seedlings (125) during an initial phase of a feed of the plant seedlings (125) to the at least one plant arm (130).

Embodiment 12. A vehicle (110), comprising a planting system (100) according to any one of the preceding embodiments, wherein the at least one plant arm (130) is arranged at the rear part of the vehicle.

Embodiment 13. A method (300) for planting seedlings, wherein the method is performed by a planting system for arrangement on a vehicle, wherein the planting system comprises at least one plant head configured to penetrate ground, wherein the at least one plant arm is configured to receive plant seedlings (125) and to guide the plant seedlings (125) to the plant head; and a plant feeding device for arrangement on the vehicle and configured to feed plant seedlings (125) to the at least one plant arm by gravitation, wherein the method comprises the steps of:

in a first stage of a planting process, feeding (310) plant seedlings (125) from the plant feeding device, via the at least one plant arm, to the plant head, by operation of the plant feeding device, and in a second stage of a planting process, penetrating (320) the ground by the plant head and releasing (330) the plant seedlings (125) from the plant head (140) into the ground.

Embodiment 14. The method (300) of embodiment 13, further comprising the steps of obtaining (340) data of at least one property of the ground, and controlling (350) the steps of feeding (310) plant seedlings (125) from the plant feeding device, via the at least one plant arm, to the plant head, by operation of the plant feeding device, penetrating (320) the ground by the plant head and releasing (330) the plant seedlings (125) from the plant head (140) into the ground, based on the data.

Embodiment 15. The method (300) of embodiment 13 or 14, further comprising the step of loading (360) plant seedlings (125) into at least one plant holder when in a pre-stage of planting, wherein the pre-stage of planting occurs prior to the first stage of planting.

The invention claimed is:

1. A planting system for arrangement on a vehicle, wherein the planting system comprises at least one plant arm comprising a plant head configured to penetrate ground, wherein the at least one plant arm comprises at least one articulation and is configured to receive plant seedlings and to guide the plant seedlings to the plant head, and a plant feeding device for arrangement on the vehicle and configured to feed plant seedlings to the at least one plant arm by dropping the plant seedlings from the plant feeding device, wherein the planting system, in a first stage of a planting process, is configured to feed plant seedlings from the plant feeding device, via the at least one plant arm, to the plant head, by operation of the plant feeding device, and wherein the planting system, in a second stage of a planting process, is configured to operate the at least one plant arm by penetrating the ground by the plant head and release the plant seedlings from the plant head into the ground while the plant system is in motion, wherein the plant seedlings fall from the plant feeding device to the plant head while the plant arm is in motion, and wherein the plant head has a fixed position relative the ground when in the second stage of the planting process by the plant arm pivoting around the at least one articulation.

2. The planting system according to claim 1, wherein the at least one plant arm comprises plant channel for receiving the plant seedlings and for guiding the plant seedlings to the plant head.

3. The planting system according to claim 2, wherein the plant channel comprises a flared opening for receiving the plant seedlings.

4. The planting system according to claim 1, wherein the plant feeding device comprises a circulating transport device comprising at least one plant holder, wherein the circulating transport device is configured to repeatedly transport the at least one plant holder from a first position, in which the at least one plant holder is arranged to receive a plant seedling, to a second position, in which the at least one plant holder is configured to release the plant seedling, and back to the first position.

5. The planting system according to claim 4, wherein the at least one plant holder comprises a side wall for keeping the plant seedlings in an upright position, and a bottom lid configured to open for releasing the plant seedling when the at least one plant holder is in the second position.

6. The planting system according to claim 1, further comprising a ground analyzing device configured to analyze at least one property of the ground, and an actuator communicatively coupled to the ground analyzing device, wherein the ground analyzing device is configured to send a first set of data of the at least one property of the ground to the actuator, and wherein the actuator is configured to operate the plant feeding device and the at least one plant arm based on the first set of data.

7. The planting system according to claim 6, wherein the ground analyzing device comprises a non-invasive measurement device configured to measure at least one property of the ground without physically contacting the ground during measurement.

8. The planting system according to claim 6, further comprising a scarifier configured to prepare the ground for planting plant seedlings, wherein the actuator is operatively coupled to the scarifier and configured to operate the scarifier based on the first set of data.

9. The planting system according to claim 6, further comprising a scarifier configured to prepare the ground for planting plant seedlings, wherein the scarifier is configured to analyze at least one property of the ground, wherein the scarifier is communicatively coupled to the actuator and configured to send a second set of data of the at least one property of the ground to the actuator, and wherein the actuator is configured to operate the at least one plant arm based on at least one of the first and second set of data.

10. The planting system according to claim 1, further comprising a scarifier configured to prepare the ground for planting plant seedlings.

11. The planting system according to claim 1,
wherein the plant feeding device further comprises
a mechanism configured to accelerate the plant seedlings during an initial phase of a feed of the plant seedlings to the at least one plant arm.

12. A vehicle, comprising
a planting system according to claim 1, wherein the at least one plant arm is arranged at the rear part of the vehicle.

13. A method for planting seedlings, wherein the method is performed by a planting system for arrangement on a vehicle, wherein the planting system comprises at least one plant head configured to penetrate ground, wherein the at least one plant arm comprises at least one articulation and is configured to receive plant seedlings and to guide the plant seedlings to the plant head; and a plant feeding device for arrangement on the vehicle and configured to feed plant seedlings by dropping the plant seedlings to the at least one plant arm,
wherein the method comprises the steps of:
in a first stage of a planting process, feeding plant seedlings from the plant feeding device, via the at least one plant arm, to the plant head, by operation of the plant feeding device, and
in a second stage of a planting process, penetrating the ground by the plant head and releasing the plant seedlings from the plant head into the ground while the planting system is in motion,
wherein the plant seedlings fall from the plant feeding device to the plant head while the plant arm is in motion, and
wherein the plant head has a fixed position relative the ground when in the second stage of the planting process by the plant arm pivoting around the at least one articulation.

14. The method of claim 13, further comprising the steps of
obtaining data of at least one property of the ground, and
controlling the steps of feeding plant seedlings from the plant feeding device, via the at least one plant arm, to the plant head, by operation of the plant feeding device, penetrating the ground by the plant head and releasing the plant seedlings from the plant head into the ground, based on the data.

15. The method of claim 13, further comprising the step of
loading plant seedlings into at least one plant holder when in a pre-stage of planting, wherein the pre-stage of planting occurs prior to the first stage of the planting process.

* * * * *